United States Patent
Sutedja et al.

(10) Patent No.: US 11,107,042 B2
(45) Date of Patent: Aug. 31, 2021

(54) ELECTRONIC DEVICE AND METHOD FOR SELECTIVELY APPLYING MESSAGE ACTIONS

(71) Applicant: BlackBerry Limited, Waterloo (CA)

(72) Inventors: Darsono Sutedja, Hudson, NH (US); Katerina Doudkin, Andover, MA (US)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 16/364,584

(22) Filed: Mar. 26, 2019

(65) Prior Publication Data

US 2019/0220823 A1 Jul. 18, 2019

Related U.S. Application Data

(63) Continuation of application No. 13/185,635, filed on Jul. 19, 2011, now abandoned.

(30) Foreign Application Priority Data

Jul. 18, 2011 (CA) ................................ CA 2746065

(51) Int. Cl.
*G06F 3/00* (2006.01)
*G06Q 10/10* (2012.01)
(Continued)

(52) U.S. Cl.
CPC ........... *G06Q 10/107* (2013.01); *H04L 51/16* (2013.01); *H04M 1/72436* (2021.01)

(58) Field of Classification Search
CPC ...... G06Q 10/107; H04L 51/16; G06F 3/0481
See application file for complete search history.

(56) References Cited

U.S. PATENT DOCUMENTS

| 5,905,863 A | 5/1999 | Knowles et al. |
| 6,092,101 A * | 7/2000 | Birrell .................. G06Q 10/107 379/93.24 |

(Continued)

FOREIGN PATENT DOCUMENTS

| EP | 1918825 | 5/2008 |
| WO | 2005103931 A2 | 11/2005 |
| WO | 2008085654 A2 | 7/2008 |

OTHER PUBLICATIONS

Wattenberg, M. et al., "E-Mail Research: Targeting the Enterprise", Human-Computer Interaction, 2005, vol. 20, pp. 139-162.

(Continued)

*Primary Examiner* — Nicholas Augustine
(74) *Attorney, Agent, or Firm* — Rowand LLP

(57) ABSTRACT

A method for displaying messages is disclosed. The method includes: displaying, on a display of an electronic device, a message thread listing view; while the message thread listing view is displayed, detecting a selection of one of the message threads; displaying a menu overlaying the message thread listing view, the menu including a user interface element associated with at least a reply-to-all action; detecting a selection of the user interface element associated with the reply-to-all action; and in response to detecting the selections of the message thread and the user interface element: automatically identifying an appropriate email message from the selected message thread based on at least a number of recipients of the appropriate message, wherein the appropriate message was received before at least one other message in the selected message thread; and replacing the message thread listing view with a message composition view for composing a reply-to-all message.

14 Claims, 6 Drawing Sheets

(51) Int. Cl.
*H04L 12/58* (2006.01)
*G06F 3/01* (2006.01)
*H04M 1/72436* (2021.01)

(56) References Cited

U.S. PATENT DOCUMENTS

| | | | |
|---|---|---|---|
| 6,144,378 A * | 11/2000 | Lee | G06F 3/0236 |
| | | | 715/767 |
| 6,549,219 B2 * | 4/2003 | Selker | G06F 3/0482 |
| | | | 345/902 |
| 6,651,879 B2 * | 11/2003 | Lapstun | B42D 15/02 |
| | | | 235/375 |
| 6,718,321 B2 * | 4/2004 | Birrell | G06Q 10/107 |
| 6,816,885 B1 | 11/2004 | Raghunandan | |
| 7,062,536 B2 | 6/2006 | Fellenstein et al. | |
| 7,110,510 B1 | 9/2006 | Shaffer et al. | |
| 7,185,059 B2 | 2/2007 | Daniell et al. | |
| 7,359,936 B2 | 4/2008 | Gruen et al. | |
| 7,457,841 B2 | 11/2008 | Bordia | |
| 7,461,151 B2 | 12/2008 | Colson et al. | |
| 7,539,295 B1 | 5/2009 | Amir et al. | |
| 7,657,839 B2 | 2/2010 | Moody et al. | |
| 7,661,067 B2 | 2/2010 | Chen et al. | |
| 7,702,315 B2 | 4/2010 | Engstrom et al. | |
| 7,716,593 B2 | 5/2010 | Durazo et al. | |
| 7,752,279 B2 | 7/2010 | Hardy et al. | |
| 7,814,160 B2 | 10/2010 | Burtner et al. | |
| 7,818,385 B2 | 10/2010 | Naick et al. | |
| 7,831,676 B1 | 11/2010 | Nagar | |
| 7,859,699 B2 * | 12/2010 | Silverbrook | G06Q 10/107 |
| | | | 358/1.15 |
| 7,912,904 B2 | 3/2011 | Buchheit et al. | |
| 7,992,102 B1 * | 8/2011 | De Angelo | G06F 3/04886 |
| | | | 715/834 |
| 8,091,129 B1 | 1/2012 | Emigh et al. | |
| 8,521,143 B2 * | 8/2013 | Balasubramaniam | |
| | | | H04L 12/1822 |
| | | | 455/412.1 |
| 8,566,923 B2 * | 10/2013 | Fredette | G06F 8/34 |
| | | | 726/19 |
| 8,645,842 B2 * | 2/2014 | Kondziela | G06Q 10/10 |
| | | | 715/751 |
| 8,683,355 B1 | 3/2014 | Gailloux et al. | |
| 8,832,190 B1 * | 9/2014 | Leske | G06Q 10/107 |
| | | | 709/204 |
| 9,477,374 B1 * | 10/2016 | Snabl | G06F 3/04817 |
| 9,715,332 B1 * | 7/2017 | Morris | G06F 3/04842 |
| 9,754,025 B2 * | 9/2017 | Roswell | H04L 12/1813 |
| 10,026,255 B2 * | 7/2018 | LeMay | G07F 17/32 |
| 2003/0163537 A1 | 8/2003 | Rohall et al. | |
| 2004/0015553 A1 | 1/2004 | Griffin et al. | |
| 2004/0137884 A1 | 7/2004 | Engstrom et al. | |
| 2004/0233238 A1 * | 11/2004 | Lahdesmaki | H04N 21/4312 |
| | | | 715/810 |
| 2004/0260756 A1 | 12/2004 | Forstall et al. | |
| 2005/0138564 A1 * | 6/2005 | Fogg | G06F 3/04817 |
| | | | 715/745 |
| 2005/0144573 A1 | 6/2005 | Moody et al. | |
| 2005/0192924 A1 * | 9/2005 | Drucker | G06F 16/58 |
| 2006/0031329 A1 | 2/2006 | Robertson | |
| 2006/0048076 A1 * | 3/2006 | Vronay | G06F 16/904 |
| | | | 715/850 |
| 2006/0161849 A1 | 7/2006 | Miller et al. | |
| 2007/0005477 A1 * | 1/2007 | McAtamney | G06Q 40/06 |
| | | | 705/35 |
| 2007/0033220 A1 * | 2/2007 | Drucker | G06F 16/48 |
| 2007/0047697 A1 | 3/2007 | Drewry et al. | |
| 2007/0180392 A1 * | 8/2007 | Russo | G06F 3/0482 |
| | | | 715/765 |
| 2007/0188494 A1 * | 8/2007 | Agutter | G06F 16/248 |
| | | | 345/440 |
| 2007/0288575 A1 | 12/2007 | Gillum et al. | |
| 2008/0126951 A1 | 5/2008 | Sood et al. | |
| 2008/0147804 A1 | 6/2008 | Gyure et al. | |
| 2008/0215687 A1 | 9/2008 | Madnani | |
| 2008/0228894 A1 | 9/2008 | Chen et al. | |
| 2008/0248788 A1 | 10/2008 | Smith et al. | |
| 2009/0083658 A1 | 3/2009 | Ito et al. | |
| 2009/0210778 A1 * | 8/2009 | Kulas | H04L 12/1822 |
| | | | 715/201 |
| 2009/0214034 A1 * | 8/2009 | Mehrotra | H04L 51/063 |
| | | | 380/255 |
| 2009/0313343 A1 | 12/2009 | Brady et al. | |
| 2009/0319911 A1 | 12/2009 | McCann et al. | |
| 2010/0076989 A1 | 3/2010 | Jakobson | |
| 2010/0077050 A1 | 3/2010 | MacBeth et al. | |
| 2010/0082759 A1 | 4/2010 | Nalliah et al. | |
| 2010/0083149 A1 | 4/2010 | McCaffrey et al. | |
| 2010/0229130 A1 * | 9/2010 | Edge | G06F 3/04883 |
| | | | 715/863 |
| 2010/0251177 A1 | 9/2010 | Geppert et al. | |
| 2010/0293475 A1 * | 11/2010 | Nottingham | H04L 51/34 |
| | | | 715/752 |
| 2011/0029629 A1 | 2/2011 | Burtner et al. | |
| 2011/0047014 A1 * | 2/2011 | De Angelo | G06F 3/04847 |
| | | | 705/14.4 |
| 2011/0219324 A1 * | 9/2011 | Watanabe | G06F 3/048 |
| | | | 715/771 |
| 2011/0231499 A1 | 9/2011 | Stovicek et al. | |
| 2011/0271230 A1 * | 11/2011 | Harris | G06F 3/0482 |
| | | | 715/810 |
| 2012/0124520 A1 * | 5/2012 | Samp | G06F 3/04886 |
| | | | 715/834 |
| 2012/0290946 A1 | 11/2012 | Schrook et al. | |
| 2012/0324017 A1 * | 12/2012 | Bellomo | G06Q 10/10 |
| | | | 709/205 |
| 2013/0019174 A1 * | 1/2013 | Gil | G06F 3/04812 |
| | | | 715/711 |
| 2013/0080975 A1 * | 3/2013 | Geithner | G06F 3/0482 |
| | | | 715/828 |
| 2014/0052538 A1 * | 2/2014 | Foote | G06Q 50/01 |
| | | | 705/14.66 |
| 2014/0310365 A1 * | 10/2014 | Sample | H04L 51/16 |
| | | | 709/206 |
| 2015/0033149 A1 * | 1/2015 | Kuchoor | G06F 3/0481 |
| | | | 715/753 |
| 2016/0334943 A1 * | 11/2016 | Jeon | G06F 3/04845 |
| 2017/0205791 A1 * | 7/2017 | Yang | G05B 23/0264 |
| 2019/0342408 A1 * | 11/2019 | Brezina | H04L 51/16 |

OTHER PUBLICATIONS

Dredze, M. et al., "Intelligent Email: Aiding Users with AI", 2008, Association for the Advancement of Artificial Intelligence (www.aaai.org).

Burns, A., "Designing a User Interface for the Innovative E-mail Client", Semester Thesis, Dec. 2005-Apr. 2006.

CIPO: CA Examination Report dated Dec. 6, 2011 relating to CA Application No. 2,746,065.

* cited by examiner

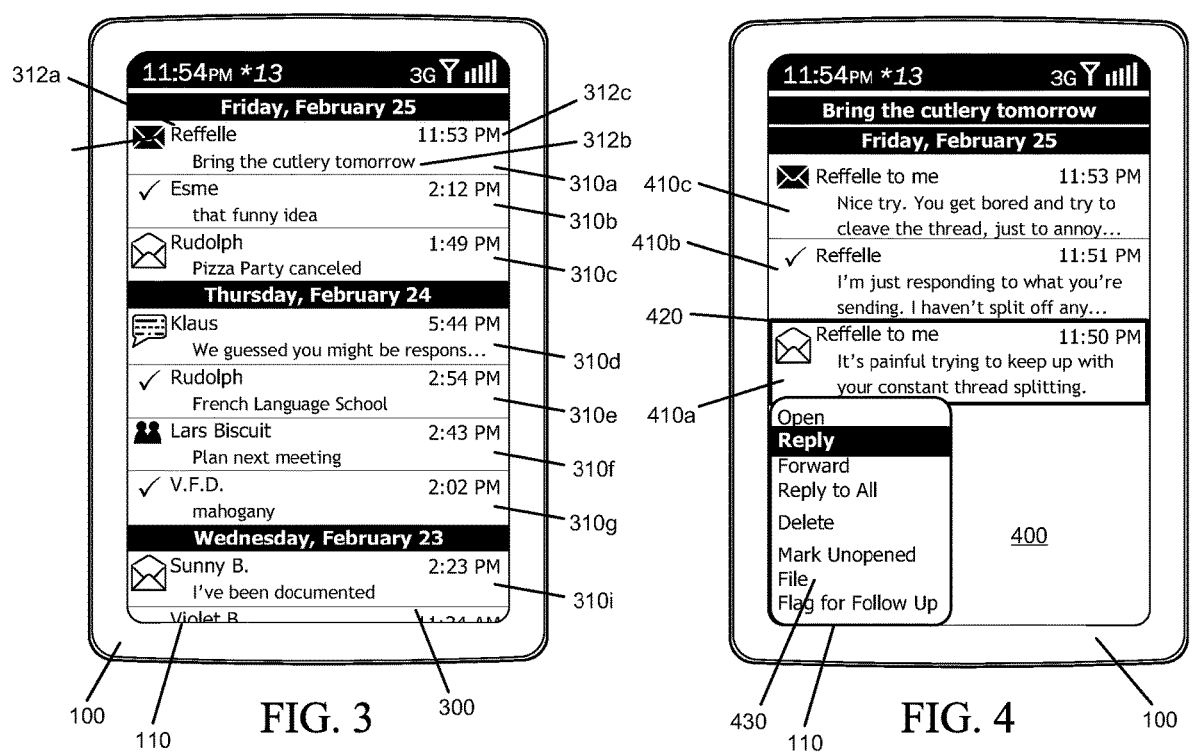

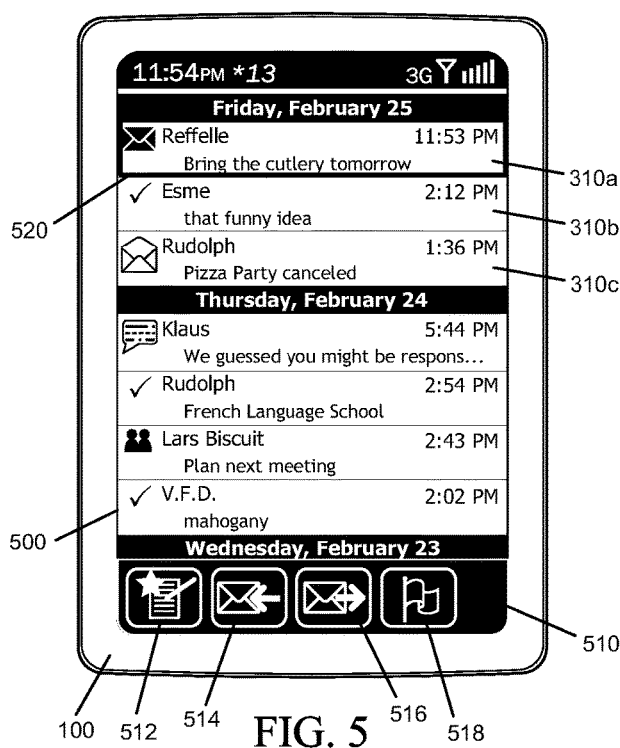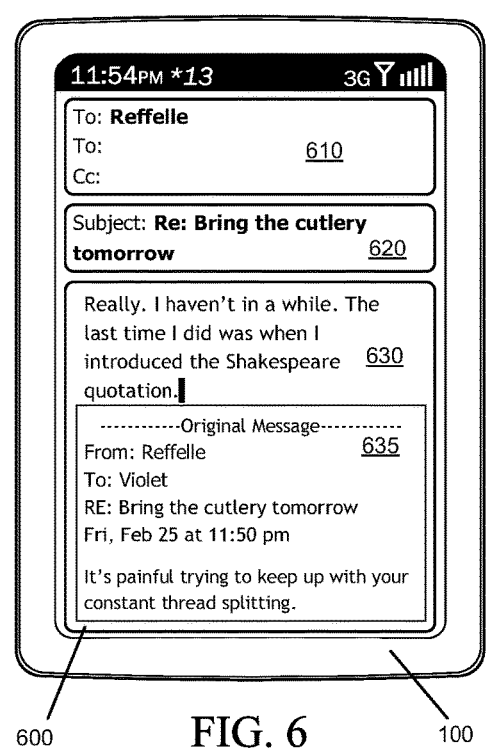

ELECTRONIC DEVICE AND METHOD FOR SELECTIVELY APPLYING MESSAGE ACTIONS

RELATED APPLICATIONS

This application is a continuation of U.S. patent application Ser. No. 13/185,635 filed on Jul. 19, 2011 which claims priority to Canadian Patent Application No. 2,746,065 filed on Jul. 18, 2011, the entirety of which are incorporated herein by reference.

TECHNICAL FIELD

The present disclosure relates generally to an electronic device and method for applying actions to electronic messages.

BACKGROUND

A messaging client executing on an electronic device may be configured to display messages to the user in a listing ordered according to a message attribute such as message timestamp, recipient or sender, or subject line. Messages may also be logically or physically grouped in threads (conversations), which are collections of messages having a common thread identifier value, subject line, or other message attribute. The messaging client may thus display an ordered listing of message threads rather than individual messages. This view provides for an efficient display of information to the user, since each entry displayed in the list may represent a group of both sent and received messages. When the user wishes to take an action applicable to a single message, such as replying to a message or forwarding a message, one of the message threads listed in the display must be selected and a further view of the messages contained within that thread displayed so that the user may select the appropriate message to which the action is to be applied.

BRIEF DESCRIPTION OF THE DRAWINGS

In drawings which illustrate by way of example only embodiments of the present application, in which like reference numerals describe similar items throughout the various figures.

FIG. 3 is an example of a graphical user interface displaying a message thread listing view on an electronic device.

FIG. 4 is an example of a graphical user interface displaying an individual message list view on an electronic device.

FIG. 5 is a variant of the graphical user interface of FIG. 3 with graphical user interface elements for message actions.

FIG. 6 is an example of a graphical user interface for a message composition screen for a reply message.

DETAILED DESCRIPTION

Figure 1:
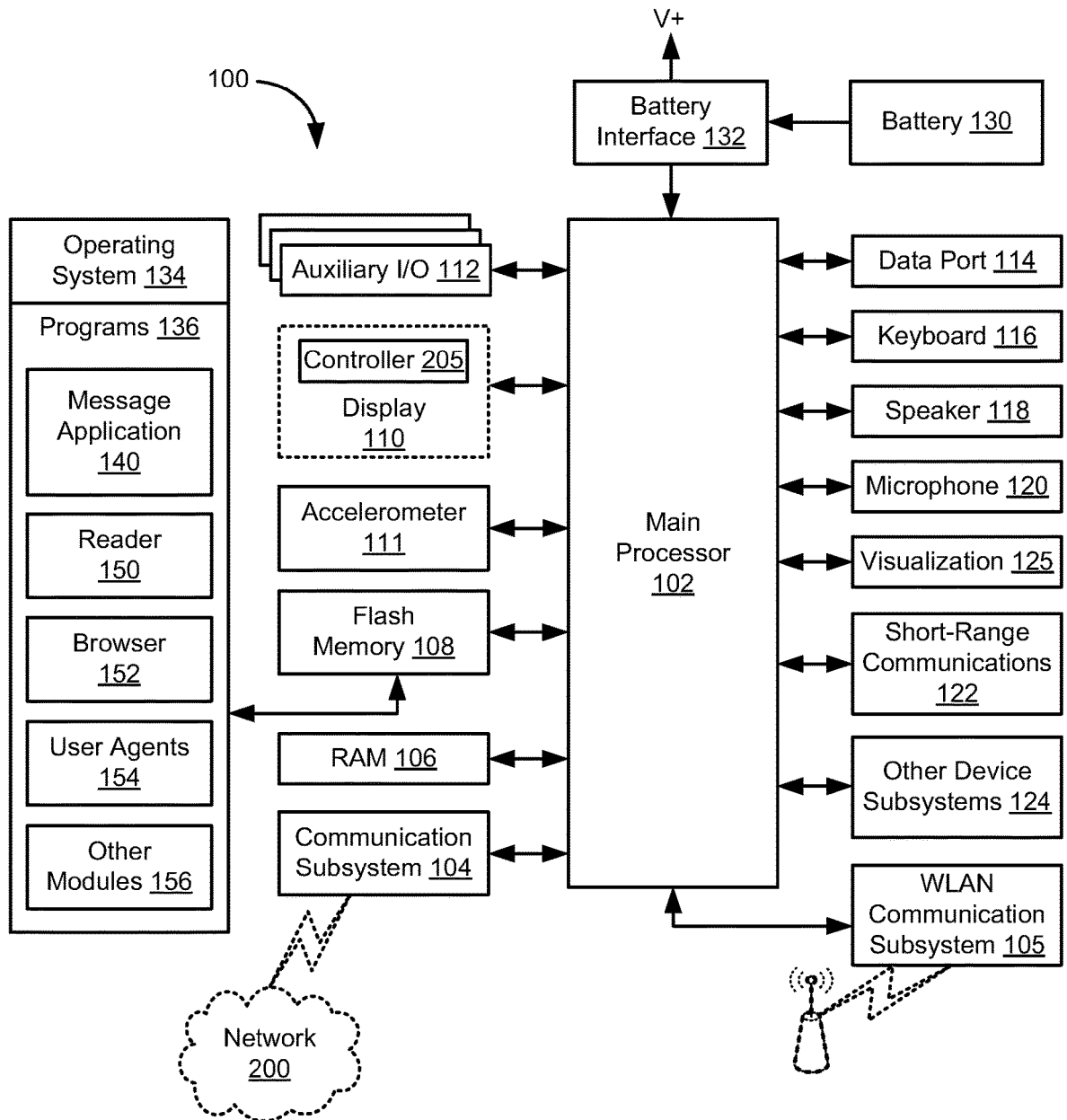
FIG. 1 is a block diagram of an embodiment of an electronic device for use with the embodiments described herein.

The embodiments described herein provide a communication device, method and system for applying a selected single-message action applicable to a single message, such as a "reply" or "forward" action, to a single message in a message thread without requiring prior user selection of that single message.

There is thus provided a method, implementable at an electronic device, for applying a single-message action to an email message, the method comprising: displaying a listing of message threads; while said listing of message threads is displayed, detecting selection of one of the message threads, said message thread comprising a plurality of email messages and detecting selection of a single-message action to be applied to a single email message, the selected single-message action being associated with at least one message attribute; identifying one of the plurality of email messages comprising said at least one message attribute; and applying the selected single-message action to said identified email message.

In some implementations, identifying the one of the plurality of email messages may comprise identifying a most recent one of the plurality of email messages comprising said at least one message attribute.

In some implementations, the at least one message attribute may comprise the message being marked opened.

In some implementations, selection of one of the message threads may comprise selection of a graphical user interface element displayed at the electronic device, the graphical user interface element corresponding to said one of the message threads, and said selection of the single-message action is carried out while said graphical user interface element is selected.

In some implementations, applying the selected single-message action may comprise displaying a message composition interface comprising content from the identified email message.

In some implementations, the selected single-message action may comprise a reply action, and the at least one message attribute may comprise the message being a received message. Alternatively or additionally, the selected single-message action may comprise a forward action, and the at least one message attribute may comprise the message being a received message; or the selected single-message action may comprise a reply to all action, and the at least one message attribute may comprise the message being a received message and the message having a plurality of recipients; or the selected single-message action may comprise a send action, and the at least one message attribute may comprise the message being a draft message having at least one designated recipient; or the selected single-message action may comprise a flag action, and the at least one message attribute may comprise either the message being a received message, the message having an attachment, or the message both being a received message and having an attachment. In yet another aspect, the identified email message need not be, and is not a most recent message in the selected message thread.

The embodiments herein also provide an electronic device for handling messages and for applying single-message actions to an email message, the electronic device comprising: a display interface; and a processor in communication with the display interface, the processor being configured to: display a listing of message threads via the display interface; while said listing of message threads is displayed, detect selection of one of the message threads, said message thread comprising a plurality of email messages, and detect selection of a single-message action to be applied to a single email message, the selected single-message action being associated with at least one message attribute; identify one of the plurality of email messages comprising said at least one message attribute; and apply the selected single-message action to said identified email message.

In some implementations, the processor may be configured to identify the one of the plurality of email messages by identifying a most recent one of the plurality of email messages comprising said at least one message attribute.

In some implementations, the at least one message attribute may comprise the message being marked opened.

In some implementations, selection of one of the message threads may comprise selection of a graphical user interface element displayed at the electronic device, the graphical user interface element corresponding to said one of the message threads, and said selection of the single-message action is carried out while said graphical user interface element is selected.

In some implementations, the processor may be configured to apply the selected single-message action by displaying via the display interface a message composition interface comprising content from the identified email message.

In some implementations, the selected single-message action may comprise a reply action, and the at least one message attribute may comprise the message being a received message; alternatively or additionally, the selected single-message action may comprise a forward action, and the at least one message attribute may comprise the message being a received message; or the selected single-message action may comprise a reply to all action, and the at least one message attribute may comprise the message being a received message and the message having a plurality of recipients; or the at least one message attribute may comprise the message being a draft message having at least one designated recipient; or the selected single-message action may comprise a flag action, and the at least one message attribute may comprise either the message being a received message, the message having an attachment, or the message both being a received message and having an attachment.

In some implementations, the identified email message need not be, and is not a most recent message in the selected message thread.

In an aspect, the present disclosure describes a method for displaying message on an electronic device. The method, implementable on an electronic device, includes: displaying, on a display of the electronic device, a message thread listing view comprising a listing of message threads, each message thread comprising a plurality of email messages; while the message thread listing view is displayed, detecting a selection of one of the message threads from the listing of message threads; displaying a menu overlaying the message thread listing view, the menu including one or more user interface elements associated with single-message actions applicable to messages of the selected message thread, wherein the single-message actions include at least a reply-to-all action; detecting a selection of a first user interface element that is associated with the reply-to-all action; and in response to detecting the selections of the message thread and the first user interface element: automatically identifying an appropriate email message from the selected message thread based on at least a number of recipients of the appropriate message, wherein the appropriate message was received before at least one other message in the selected message thread; and replacing the message thread listing view with a message composition view for composing a reply-to-all message, wherein an address field of the reply-to-all message is pre-populated using addresses from the identified appropriate message.

In some implementations, the identifying of the appropriate email message may occur while the message thread listing view is displayed.

In some implementations, identifying the appropriate email message may comprise determining that the appropriate message has multiple recipients.

In some implementations, identifying the appropriate email message may comprise determining that the appropriate message was received before a most recently received message in the selected message thread.

In some implementations, identifying the appropriate email message may comprise identifying a most recently received message that has multiple recipients in the selected message thread.

In some implementations, the reply-to-all message may be composed as a reply to the identified appropriate message.

In some implementations, content of the identified appropriate message may be quoted in the reply-to-all message.

There is also provided an electronic device program product comprising an electronic device-readable medium, which may be a non-transitory or physical medium, storing code which, when executed by an electronic device, causes said electronic device to carry out the methods described herein.

These embodiments will be described and illustrated primarily in relation to electronic devices, which include wireless communication devices, communicating over wireless networks and public networks. It will be appreciated by those skilled in the art, however, that this description is not intended to limit the scope of the described embodiments to implementation on these particular systems or to wireless devices. For example, the methods and systems described herein may be applied to any appropriate electronic device adapted to communicate with another electronic or communication device using a direct or network communication interface. The electronic device may be adapted to communicate over a fixed or wireless connection, and may be portable or wirelessly enabled or not, provided with voice communication capabilities or not, and additionally or alternatively may be adapted to process data and carry out operations on data in response to user commands for any number of purposes, including productivity and entertainment. Thus, the embodiments described herein may be implemented on electronic devices adapted for communication or messaging, including without limitation cellular phones, smartphones, wireless organizers, personal digital assistants, desktop computers, terminals, laptops, tablets, handheld wireless communication devices, notebook computers, portable gaming devices, Internet-connected televisions, set-top boxes, digital picture frames, in-vehicle entertainment systems, entertainment devices such as MP3 or video players, and the like. Unless expressly stated, an electronic device may include any such device or any device capable of sending and receiving, or implementing a messaging client for use in sending and receiving, messages to one or more recipients. As contemplated herein, the electronic device may have an integrated display interface, or may comprise a display interface configured to output data to be rendered or painted to an external display unit such as an external monitor or panel, television screen, projector, or virtual retinal display (via a data port or transmitter, such as a Bluetooth® transceiver, USB port, HDMI port, DVI port, and the like). References herein to a "display" or "display interface" are intended to encompass both integrated and external display units as well as data ports and transmitters used to output signals to external display units.

The embodiments herein will also be described and illustrated primarily in relation to email messages, such as those constructed and implemented in accordance with known Internet messaging standards including Internet Message Format RFC 5322 and RFC 2822, published by the Internet Engineering Task Force, as well as their predecessor, successor, and companion standards. However, it will also be appreciated by those skilled in the art that these embodiments are not intended to be exclusive of other message types or applications, and extend to other types and formats of messages, whether text or multimedia-based. Generally these message formats are adaptable to support the creation of "child" messages based on a "parent" message. A non-limiting example of this is the generation of a reply or forward message (the child message) from an earlier message (the parent message). The child message may comprise an express or implied reference to the parent message, for example by including a value in the child message header expressly referring to a message identifier for the parent, or by including in the child message body content at least an excerpt of the message body content of the parent. Each message may thus be expressly or impliedly associated with another specific message. The definition of such reply or forward messages using various identifiers or techniques will be known to those skilled in the art.

The association of individual messages in this manner may be contrasted to those message protocols in which the messages are delivered between senders and recipients in a single session or stream ("conversation"), in which later messages are not associated with a specific earlier message in the stream, but are generally only associated with the stream itself. However, the person skilled in the art will appreciate that any appropriate message format may be employed, provided it is adaptable for use with the embodiments described herein. Examples of other message formats include private messages, SMS (Short Message Service), MMS (Multimedia Messaging Service), VVM (Visual Voicemail) and the like. The message formats to which these embodiments are applicable need not be restricted to those standardized formats. The formatting and transmission of all such messages, storage and indexing of such messages, and the implementation of suitable messaging infrastructures to support such communications, will also be known to those skilled in the art.

These embodiments are also generally described as being implemented in conjunction with messaging client applications that are configured to display messages both individually and collectively in a display of message "threads", as discussed below. The messaging client need not be limited to a single-purpose or single-message format application; for example, messages may be generated and transmitted using a social networking client application, or a collaborative or groupware client application.

FIG. 1 is a block diagram of an example embodiment of an electronic device 100 that may be used with the embodiments described herein. The electronic device 100 includes a number of components such as a main processor 102 that controls the overall operation of the electronic device 100. It should be understood that the components described in FIG. 1 are optional and that an electronic device used with various embodiments described herein may include or omit components described in relation to FIG. 1.

Communication functions, including data and voice communications, are performed through one or more communication subsystems 104, 105, and/or 122 in communication with the processor 102. Data received by the electronic device 100 can be decompressed and decrypted by decoder 103, operating according to any suitable decompression techniques, and encryption/decryption techniques according to one or more various encryption or compression standards known to persons of skill in the art.

If equipped with a communication subsystem 104, this subsystem 104 receives data from and sends data to wireless network 200. In this embodiment of the electronic device 100, the communication subsystem 104 is configured in accordance with one or more wireless communications standards. New wireless communications standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for the wireless communications standard, and optionally other network communications.

The electronic device 100 may be provided with other communication subsystems, such as a wireless LAN (WLAN) communication subsystem 105 or a short-range and/or near-field communications subsystem 122 also shown in FIG. 1. The WLAN communication subsystem 105 may operate in accordance with a known network protocol such as one or more of the 802.11™ family of standards developed or maintained by IEEE. The communications subsystems 105 and 122 provide for communication between the electronic device 100 and different systems or devices without the use of the wireless network 200, over varying distances that may be less than the distance over which the communication subsystem 104 can communicate with the wireless network 200. The subsystem 122 can include an infrared device and associated circuits and/or other components for short-range or near-field communication.

It should be understood that any of the communication subsystems 104, 105, 122 may optionally be included in the electronic device 100. Alternatively, a communication subsystem comprised in a dongle or other peripheral device (not shown) may be connected to the electronic device 100, either wirelessly or by a fixed connection such as a USB port, to provide the electronic device 100 with access to a network. If provided onboard the electronic device 100, the communication subsystems 104, 105 and 122 may be separate from, or integrated with, each other.

The main processor 102 also interacts with additional subsystems, if present, such as a Random Access Memory (RAM) 106, a flash memory 108, a display 110, other data and memory access interfaces such as an auxiliary input/output (I/O) subsystem 112 or a data port 114, a keyboard 116, a speaker 118, a microphone 120, the communications 104, 105, 122 and other device subsystems 124. The communication device may also be provided with an accelerometer 111, which may be used to detect gravity- or motion-induced forces and their direction. Detection of such forces applied to the electronic device 100 may be processed to determine a response of the electronic device 100, such as an orientation of a graphical user interface displayed on the display assembly 110 in response to a determination of the current orientation of the electronic device 100. The electronic device 100 may be a battery-powered device including a battery interface 132 for receiving one or more rechargeable batteries 130.

In embodiments where a display is integrated with the electronic device, the electronic device 100 may comprise a touchscreen-based device, in which the display interface 110 is a touchscreen interface that provides both a display for communicating information and presenting graphical user interfaces, as well as an input subsystem for detecting user input that may be converted to instructions for execution by the device 100. The touchscreen display interface 110 in such embodiments can be the principal user interface provided on the electronic device 100, although in some embodiments, additional buttons, variously shown in the figures or a trackpad, or other input means may be provided. If a touchscreen display interface 110 is provided, then other user input means such as the keyboard 116 may or may not be present. The controller 216 and/or the processor 102 detects touches by any suitable contact member on the touch-sensitive display 110.

A visualization processor or module 125 is included in the electronic device 100. The visualization module 125 analyzes and processes data for visualization on the display 110. Data originally prepared for visualization on a large-screen display may require additional processing prior to visualization on a small-screen display. This additional processing is accomplished by the visualization module 125. As will be appreciated by those of skill in the art, the visualization module can be implemented in hardware, software, or a combination thereof, and can comprise a dedicated image processor and associated circuitry, or can be implemented within main processor 102.

The electronic device 100 also includes an operating system 134 and software components 136 to 152. The operating system 134 and the software components 136 to 152 that are executed by the main processor 102 are typically stored in a persistent store such as the flash memory 108, which can alternatively be a read-only memory (ROM) or similar storage element (not shown). Those skilled in the art will appreciate that portions of the operating system 134 and the software components 140 to 152, such as specific device applications, or parts thereof, can be temporarily loaded into a volatile store such as the RAM 106. Select other modules 152 may also be included, such as those described herein. Other software components can also be included, as is well known to those skilled in the art.

A subset of software applications 136 that control basic device operations may be installed on the electronic device 100 during its manufacture. Other software applications include a messaging client 140 that can be any suitable software program that allows a user of the electronic device 100 to send and receive electronic messages. Other types of software applications can also be installed on the electronic device 100, such as feed or content readers 150, web browsers 152, other user agents 154, and other modules 156. These software applications may be supplied by the electronic device manufacturer or operating system provider, or may be third party applications. The additional applications can be loaded onto the electronic device 100 through at least one of the communications subsystems 104, 105, 122, the auxiliary I/O subsystem 112, the data port 114, or any other suitable device subsystem 124. This flexibility in application installation increases the functionality of the electronic device 100 and can provide enhanced on-device functions, communication-related functions, or both.

Various alternatives exist for the messaging client 140 as is well known to those skilled in the art. Messages that have been sent or received by the user using the electronic device 100 are typically stored in the flash memory 108 of the electronic device 100 or some other suitable storage element in the electronic device 100. In at least some embodiments, some of the sent and received messages can be stored remotely from the device 100 such as in a data store of an associated host system with which the electronic device 100 communicates, while header information (e.g., sender and recipient identities, subject line if applicable, message identifier or number, and optionally additional metadata such as message size or message content such as an excerpt of the message body) is provided to the device 100 for display via the messaging client 140. In some embodiments message stores are hosted in a remote location, accessible from the electronic device 100 over a network connection using either the messaging client 140 or another user agent 154, or the web browser 152. The electronic device 100 thus provides a user interface to the message stores and messaging services that are hosted remotely.

In use, a received signal such as message or information about a message will be processed by the receiving communication subsystem 104, 105, 122 and input to the main processor 102. The main processor 102 will then process the received signal for output to the display 110 or alternatively to the auxiliary I/O subsystem 112. A subscriber can also compose data items, such as messages, using the keyboard 116 in conjunction with the display interface 110 and possibly the auxiliary I/O subsystem 112 (or, in the case of a touchscreen electronic device 100, using only the display interface 110). The auxiliary subsystem 112 can include devices such as: a touchscreen, mouse, track ball, infrared fingerprint detector, or a roller wheel with dynamic button pressing capability. The keyboard 116 may be an alphanumeric keyboard and/or telephone-type keypad. However, other types of keyboards can also be used. It will be appreciated that if the display 110 is a touchscreen, then the electronic may still comprise one or more other auxiliary subsystem 112 devices. A composed item can be transmitted over the wireless network 200 or other network connection using an appropriate communication subsystem.

The communication subsystem component 104 may include a receiver, transmitter, and associated components such as one or more embedded or internal antenna elements, Local Oscillators (LOs), and a processing module such as a Digital Signal Processor (DSP) in communication with the transmitter and receiver. The particular design of the communication subsystems 104, 105, 122, or other communication subsystem is dependent upon the communication network 200 with which the electronic device 100 is intended to operate. Thus, it should be understood that the foregoing description serves only as one example.

A single electronic device 100 may be provisioned for a single or for multiple messaging accounts and be configured to employ one or more messaging formats. For example, the user may wish to access multiple services operating over the same or different networks to send and receive messages in different formats, or multiple services providing messages in the same communication format. An example of this is email messages received both at a user account maintained by a host system with which the electronic device 100 is registered and optionally configured to communicate via an encrypted tunnel, and at a user account provided by a third party service provider whose services are available to the general public. Typically, messages associated with different accounts, services and/or formats are stored in distinct data stores, folders or files at the electronic device 100. For example, each message item received or generated at the electronic device 100 in association with a given service (such as email) can be stored as a separate message or data object in a data store associated with the service, retrievable for presentation to the user using a dedicated application executing at the electronic device 100 and associated with that particular message, service, or content format.

In addition, the message objects may be indexed for retrieval on the electronic device 100 either through the dedicated application itself, through a unified search process implemented in the device operating system, or through another application or process for presentation of message listings or content for multiple accounts, services or formats. An example of this latter type of message application is a "unified inbox" or "unified message box" application, which is configured to present to the user a message listing display that can be considered to be a global message or content list. For clarity, as will be appreciated by those skilled in the art, the term "unified inbox", unless stated otherwise, is intended to be inclusive of an application providing message listings that can include references not only to received messages, but also to messages originating and/or transmitted from the electronic device 100, drafts, and other messages that are not received at the device or stored in received message folder or inbox data store. The unified inbox thus provides a unified view of message information that serves as an entry point for access to individual messaging services or individual messaging applications associated with each of the message types included in the unified inbox. The message or content elements displayed in the unified inbox display may include, in the case of messages such as email, header data such as sender, timestamp, and subject line. In addition, or alternatively, at least a portion of the message body content may also be displayed in the unified inbox. In the case of other message types, such as instant messages, the information displayed may include message body content in place of message header data.

Figure 2:
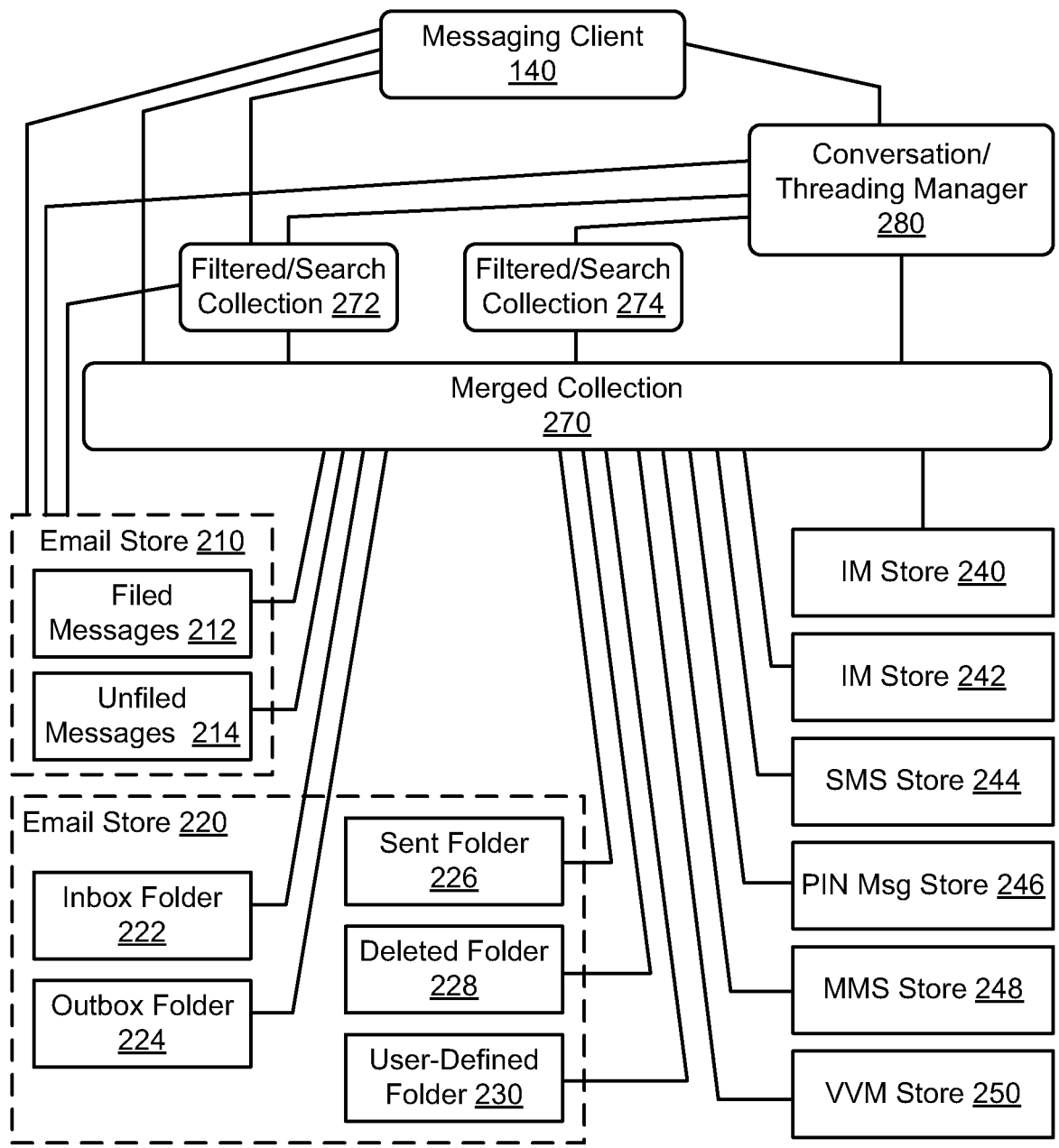
FIG. 2 is a schematic diagram illustrating interoperation of message data stores, collection objects, and a messaging client executing on the electronic device of FIG. 1.

FIG. 2 provides a more detailed illustration of a possible arrangement of message data stores to facilitate grouping of distinct messages in conversations or threads for presentation by the messaging client 140. These data stores may be maintained at the electronic device 100 or at a remote location accessible to the electronic device 100. In the case of a mobile communication device, message data stores are typically maintained at the device itself, although the data stores at the device may represent only a portion of the complete message data stored in association with a given messaging account. Complete data stores may also be maintained at a remote location as noted above. In FIG. 2, the data accessible to the electronic device 100 is provided in a number of distinct data stores, including first and second email stores 210, 220, first and second IM stores 240, 242, an SMS store 244, PIN message (messages addressed using a personal identification number rather than an email address or telephone number) store 246, MMS store 248, and VVM store 250. Messages of various formats may be stored as objects in their corresponding data store. Multiple data stores for a given type of message format, such as the email stores 210, 220 and the IM stores 240, 242 may be associated with different user accounts or different services. Further, messages may be stored in virtual "folders" within a given message store, as illustrated for the email stores 210, 220. The first email store 210 includes two folders, one for "filed" messages 212 and one for "unfiled" messages 214. "Filed" messages are those that the user has chosen to save in a specific subfolder, either at the electronic device 100 or in a remote data store. Allocation of a message to a folder may be determined from a relationship of the message to others in a specified data structure; for example, all messages in an inbox folder may be appended to a single inbox file, and thus considered to be contained in the inbox "folder", although no subdirectory or folder containing further message objects is maintained. Allocation to a folder may also be made by setting a flag or other attribute value associated with the message; thus, a message is "filed" if a flag or attribute defining a folder is set. The remaining messages in the email store 210 that are not "filed" are thus unfiled messages 214. The second email store 220 includes an inbox folder 222, which may be a default folder specified for all incoming messages received at the electronic device 100 or at an online service or at the host system on behalf of a user account accessible the electronic device 100; a sent folder 226, which may be another default folder specified for all messages sent successfully from the electronic device 100, or sent on behalf of a user account associated with the communication device; an outbox folder 224, another default folder specified for all messages in the process of being transmitted from the electronic device 100; a deleted folder 228 specified for those messages marked for deletion; and other user-defined folders 230. Implementation of message "folders"—whether by means of an explicitly-set flag value, inclusion of a message in a particular file or physical location, and the like, will be understood by those skilled in the art, and all such embodiments are contemplated herein.

The presence of a message in a folder may thus be associated with an attribute of the message; those messages in the inbox folder 222 are messages having the attribute of being a received message, while messages in the outbox folder 224 are messages having the attribute of being in transmission ("transmitting" messages), and messages in the sent folder 226 have the attribute of being sent messages, i.e. messages originating from a message account accessible at the electronic device 100. However, the presence of a message in a folder need not be used to determine whether a message possesses a given attribute. For example, messages need not be stored in the folders defined in FIG. 2, but instead may be stored in association with one or more flags or attribute values defining whether the message is a received, sent, or transmitting message. The message data stores include not only the message data itself (i.e., the message header and the message payload or content), but also ancillary information about the message such as metadata, including select message attributes. Some metadata may be provided within the header of the message. Other metadata such as internal message and thread identifiers (which may be different from message-ID, thread-ID or other message or in-reply-to values inserted into a message header for delivery), flags and timestamps, may be generated at the electronic device 100 and stored in association with the message upon receipt of the message or upon initial storage of the message in a communication device message store, and are not necessarily delivered with the message itself when the message is sent.

Attributes may be set by a message server, electronic device, or sender, such as flags indicating an importance or priority level, flags representing labels or tags assigned to a message (which may be set manually by a recipient or automatically by a communication device upon receipt), and flags or other values representing common message states or attributes such as "read", "new", "recent", "draft", "transmitting" or "pending", "draft", "deleted" and "error". The meanings of such attributes will be known to those skilled in the art, and as those skilled in the art will appreciate, these attributes are not intended to be limited by a single literal meaning and other terminology may be considered to be synonymous with these attributes. For example, "opened" may be considered to be synonymous with "read" and "unopened" with "unread". The existence of a flag or attribute associated with a given message may imply that its converse does not apply; for example, if a message is marked "read", it is not "unread" or "new", and thus it is not necessary to set a status value or flag indicating that the message "unread" or "new". Select attributes may transition through a series of values during the life cycle of a message, either in direct response to a user action or automatically in response to external or automated events, without requiring direct user action. For example, when a message is received at the electronic device 100, it may be stored in its corresponding data store 210 . . . 250 with a flag or status value indicating that it is "new". When the message is accessed and read by the user, the "new" status value is deleted, and a new status value of "read" is stored with the message. This updating of the message status is thus carried out in response to the user's actions. As another example, when a message composed at the electronic device 100 is initially transmitted over the network 120 for delivery to a recipient, it may be stored in its corresponding data store 210 . . . 250 with a "transmitting" status value or flag, indicating that the message is in the process of being transmitted from the electronic device 100, but no confirmation of successful transmission has been received. The "transmitting" status may be equivalent to a "pending" status, in that the status of the message is temporary pending a change to a more persistent status. This status may also be referred to as an "outbox" status, as the device's queue for outbound messages for transmission may be known as or represented by an outbox folder. Select attributes may be alterable or reversible by the user invoking a direct command to alter the attribute. A message that is originally "new" is changed to have a "read" or "opened" attribute once the user selects that particular message for display or other presentation (such as text-to-speech rendering), but this latter attribute may be altered by the user to "unread" or "unopened" even after it has been rendered for presentation at the electronic device 100.

The various message stores 210 . . . 250, whether they are maintained at the electronic device 100 and/or at a remote location, comprise a set of data sources that may be directly accessed from the electronic device 100 and processed in diverse ways for customized presentation using a client application, such as the aforementioned messaging client 140. The messaging client 140 may directly access the data store, as illustrated in FIG. 2, for example, where the messaging client 140 directly accesses the email store 210. Further, the messaging client 140 may register as a listener for each store 210 . . . 250 of interest, and receive notifications from each store 210 . . . 250 upon a change (such as storage of a new message in the message store or an update to the status of an existing message). This may result in a large number of listeners registered for each message store 210 . . . 250, and requires the messaging client 140 to identify and register with each store of interest.

For convenience, a merged message collection object 270 can be defined to create an aggregate master index of references for any messages stored in one of the message stores 210 . . . 250. An example of such an object is identified in U.S. Pat. No. 7,568,011, issued Jul. 28, 2009, the entirety of which is incorporated herein by reference. Briefly, an instance of a merged message collection class serves as a message aggregating object which registers as a listener with one or more of the various message stores 210 . . . 250 and/or folders within these stores. Each such store and/or folder returns to the merged message collection object 270 an index of references to each of the messages contained in that store and/or folder comprising references to messages stored in the respective message store, as well as other optional metadata such as the message's status or timestamp. The merged message collection object 270 aggregates these indices to define an aggregated or merged collection of messages, which is then provided to the messaging client 140 to identify and retrieve message data directly from one of the data stores 210 . . . 250, and to generate message listing displays using techniques known in the art.

One or more filter or search collection objects 272, 274, which are defined with reference to one or more filter criteria to define a filtered collection of messages, may be provided. The filter collection object 272, 274 registers as a listener with the merged message collection object 270, and receives notifications when the aggregated index changes (by addition or removal of a message or a change to a message status). Optionally, the filter collection object 272, 274 may register directly with one or more of the data stores, and receive notification from the data stores when a change is detected. The filter criteria may comprise particular values of specific message attributes or header values. Examples of filter criteria include the "sent" attribute, or a keyword or string that may be contained in the message body content. The filter can operate to either exclude messages having an attribute matching the filter criteria, or to pass through only those messages with attributes matching the filter criteria.

Messages are often presented in a message application in a "conversation" or "threaded" mode, in which messages identified as belonging to a common thread are grouped together and presented in a single entry in a view comprising a listing of message threads. Accessing one of these single entries then invokes a further individual message list view in which the messages identified as belonging to that thread are displayed. Examples of the first message listing view and the further individual message list view are shown in FIGS. 3 and 4 respectively, which are discussed in further detail below. The categorization or grouping of messages may be carried out using a variety of different rules and heuristics. A simple method of categorizing messages as belonging to a single "thread" is to assign all messages containing the same subject line (after excluding prefixes and tokens such as "Re:", "Fw:", and other strings denoting that a message is a reply or forward of a previously received message) to one thread. Another method of grouping parent and child (i.e., reply and forward) messages together in a thread is to determine whether messages are linked through an In-Reply-To value included in the message header, since the value would identify at least the immediately previous message in the message thread. Threads defined in this manner or in a similar manner may be referred to as "conversations", since it is presumed that the messages are linked through common topics, as is typical of oral conversation.

However, the term "thread" is used herein to refer not only to specific groups or subcollections of messages that are determined to be related with each other through common topics or through assignment of a common thread identifier or other common token, but also to groups or subcollections of messages that are determined to be related with each other through other specifically defined common message characteristics or attributes. Messages that include a specific, predefined string of characters in their subject or body (for example, all messages that contain "Banff" in the subject or body) may be determined to belong to a single group or thread, or all messages identifying the same group of addresses or contacts in its header (whether they are identified in a To:, Cc: or From: line) may be determined to belong to a single group or thread. Identification of a thread in these examples may be carried out using a filtered or search collection from one of the filter objects 272, 274, although a search could be executed directly on a given message store, such as the email message store 210, rather than using the aggregated index.

Membership in a thread may be established by defining and storing a thread identifier in association with each message for later retrieval; however, in some embodiments, no express thread identifier may be set, and instead the message threads or groupings are determined by executing a search using a defined keyword or selected attribute on the unthreaded message collection.

Determination of thread membership may be carried out by the messaging client 140 based on the message collection it accesses from the data stores 210 . . . 250, the aggregate index of messages received from the merged message collection object 270, or from a filtered collection obtained from the filter collection object 280. The threading function is thus integrated with the client application. The threading function need not be integrated with the client application, and may instead be carried out by a separate module at the electronic device 100. These options are represented by the conversation or threading manager 280 depicted in FIG. 2. The operation of the threading manager 280 is described in further detail below. The threading manager 280 may directly register with individual message stores 210 . . . 250 to obtain message updates, but may also register with the merged message collection object 270 or the filter collection object 272, 274, and make user of the aggregated index or filtered index to classify messages into threads or other related categories. The threading manager 280 then generates a threaded index of messages derived from the merged index or from the individual message stores, querying the individual message stores 210 . . . 250 as necessary to obtain any message attributes required to determine membership of a given message in a thread. The messaging client 140 would then register with the threading manager to obtain the threaded message index to obtain thread data to display a listing of threads in an inbox or other message listing display. A fuller description of the interoperation of the threading manager 280, the merged collection 270, filter collection objects 272, 274, messaging client 140, and various stores 210 . . . 250 is provided in U.S. patent application Ser. No. 13/025,822 filed on Feb. 11, 2011, the entirety of which is incorporated herein by reference.

FIGS. 3 and 4 provide example results of the processes described above as they may be depicted in a unified message box or unified inbox. The messaging client 140 is configured to generate a view comprising graphical user interface elements for display on the electronic device display 110 representing individual messages and threads of messages. The user may interact with the graphical user interface elements through commands input via one of the input interfaces provided for the electronic device 100 (e.g., the keyboard 116 or a touchscreen display interface, where the display interface 110 comprises a touchscreen) to invoke actions to be applied to a selected message or message thread.

FIG. 3 illustrates a message thread listing view 300 of the messaging client 140. In this example, membership of a message is defined based on a common root subject line (i.e., the subject line of the message, omitting prefixes such as "Re:" and "Fw:", and the like). Data for the threads represented in the view 300 may be obtained by the messaging client 140 from a threaded indexed received form the threading manager 280 as described above. The thread listing is constructed by the messaging client 140 by traversing the threaded index to identify all messages corresponding to each thread identifier, and to determine message thread attributes for the listing entry such as a thread status (described in detail in the aforementioned U.S. Patent Application) and thread timestamp based on the individual timestamps and statuses of messages that are identified as members of that thread. A thread's timestamp, for example, is typically the latest timestamp associated with any individual message belonging to the thread. The thread's status may be derived from a single message's attributes (e.g., if the most recently received message in the thread is unread, then the thread's status is unread). Alternatively, the messaging client 140 may track message threads and the membership of each message received at or sent from the electronic device 100 in an associated thread.

Once the messaging client 140 has identified the various message threads and their associated attributes, the message threads are collated according to a selected collating criterion. In the example of FIG. 3, the typical collation criterion of thread timestamp is used, and the thread entries 310a . . . 310i are listed in reverse chronological order, as illustrated by the timestamps depicted in FIG. 3. Each thread entry, as illustrated with reference to the first entry 310a, includes an identifier of a last sender and/or recipient in the thread 312a, a root subject line (when available) 312b, and the thread timestamp 312c. For those threads comprising messages that typically do not include a subject line, such as instant messages or SMS messages, the thread entry may instead comprise the most recent message sent or received in the thread, or an excerpt thereof.

The identifier 312a may be the email address or friendly name (as may be stored in an address book at the electronic device 100 in association with the sender/recipient's email address) of the sender of the message with the latest timestamp in the thread (in which case the identifier 312a could identify the user of the electronic device 100, since the user may have been the last sender in the thread), of the sender of the most recent message in the thread that was sent by a party other than the user of the electronic device 100, or of the sender and all recipients of messages in the thread, which may or may not exclude the user of the electronic device 100. In the example of FIG. 3, the identifier 312a references the sender of the most recent message in the thread that was not sent by the communication device user. Thus, the thread entry 310a in this embodiment indicates at a glance what other participant had last contributed a message to the thread, but does not indicate to the user who the recipients of that message other than the user him- or herself may have been.

This example illustrates that detailed information relevant to the state of the message thread is sometimes omitted due to design choice, space constraints in the view 300, and/or the size of the display interface 110. In order to determine who the individual recipients or other senders of messages in a thread may have been, a further view must be generated by the messaging client 140 to list the individual messages of the thread. In addition, it will be appreciated that certain actions that are generally applied to a single message—such as opening an individual message for reading, replying to a message, forwarding a message, flagging or deleting a message, and so forth—require that a specific message be identified for that action. The listing of message threads in FIG. 3 efficiently displays consolidated information for a number of messages by displaying thread entries, but because the only entries listed are for message threads, a single message contained within a thread consisting of multiple messages cannot be expressly selected by the user using the view 300.

Accordingly, one solution is to display a further individual message view in response to the selection of a particular message thread in the view 300. An example of such a further individual message view is illustrated in FIG. 4, which shows an individual message view 400 invoked upon selection of the first thread entry 310a in FIG. 3. This new message view 400 shows that there are three messages in the thread 410a, 410b, 410c. In this example, the information displayed for each message entry in the view identifies the sender and recipient of the message, along with an excerpt from the message body content. From this view the user can select an individual message in order to carry out a single-message action, such as opening the selected message to read it, deleting the selected message, replying to the selected message, and so forth. A "single-message" action, in this context, is a message processing or handling action that is typically applied to a single identified message, whether that message is contained within a message thread or not. For example, the third message displayed 410a may be selected using input means provided at the electronic device 100—as represented by the highlight box 420—and a context menu 430 invoked, from which one of a number of possible actions such as "open" (to display the message for viewing), "reply", "forward", and so forth can be selected. Once selection of an action is detected, that action is applied to the specific selected message.

The display of the further individual message view 400 adds an extra step to the process of applying an action to a selected individual message. Thus, while the threaded view 300 showing the listing of message threads provides efficiencies in display, that efficiency is reduced since the messaging client 140 must listen for a further input command (to select the thread 310a) and retrieve message data from the appropriate message stores to render the further message view 400 before a command can be received to apply a single-message action to a selected message in the thread. This results in a possible increase in processing overhead, since additional memory reads are required to retrieve the message information required for the further individual message view 400, and since the electronic device 100 must be configured to detect both the selection of a message thread as well as selection of a message with the thread, in addition to selection of an action to be applied to the message.

To address this inefficiency, the messaging client 140 can be configured to automatically and intelligently identify a specific message in a message thread when a selection of a single-message action is detected, and to apply the selected single-message action to the identified message without requiring the intermediate display of the further individual message view 400. The message that is identified may vary according to the type of single-message action selected, even if the different actions are to be applied to a message in the same thread.

An example of this solution is illustrated in FIGS. 5 and 6. FIG. 5 illustrates a similar view 500 to that shown in FIG. 3. The view 500 comprises a listing of message threads, just as in FIG. 3. When a given message thread entry (such as the thread entry 310a) is selected (as indicated by highlight box 520) and a command to invoke an action applicable to a single message is detected by the electronic device 100, rather than merely displaying a view listing the individual messages in the selected message thread, one of the individual messages in the thread is automatically selected by the messaging client 140 for application of the single-message action. In the example of FIGS. 5 and 6, the "reply" action is selected (i.e., a command is received by the electronic device 100 to create a new message for transmission from the electronic device 100 as a response to an existing message).

The next view displayed by the messaging client 140 is therefore a view such as the message composition view 600 of FIG. 6, rather than a list of individual messages in the thread as in FIG. 4. As is conventional in the art, the message composition view 600 includes an address field 610 in which addresses or names of addressees may be input; a subject line field 620, and a message body input field 630, where message content can be entered by the user. Since the selected action was "reply", the address field 610 is automatically populated with the address and/or name of the sender of a particular message in the thread. Also, since the example of FIGS. 5 and 6 is of an email thread and reply, the subject line field 620 is populated with the root subject line of the thread, in this case preceded by a token indicating that the message being generated is a reply to an earlier message in the thread. Further, because the message thread in this example is an email thread, the message body further comprises an automatically-inserted quoted copy of the message 635 for which the new reply message is being generated; this quoted copy 635 is the message in the thread automatically selected by the messaging client 140. It will be appreciated, though, that while conventionally in email correspondence the messaging client 140 typically inserts a copy of the message to which a reply is being composed, the addition of the quoted copy 635 is not necessary. In some embodiments, for example, the quoted copy 635 is not inserted at the electronic device 100, but rather by the messaging server associated with the device 100 once the message is transmitted from the device 100 to the messaging server for routing to the recipient(s).

Figure 7:
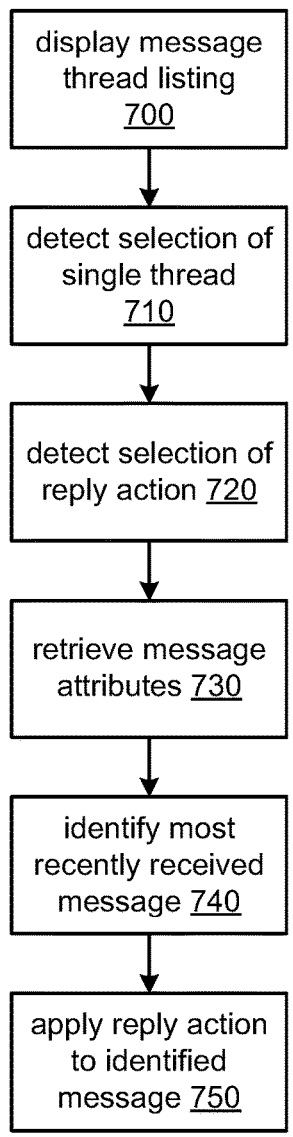
FIG. 7 is a flowchart illustrating a process for selecting a message for application of a reply action.

The process of selecting an individual thread entry from the message thread listing view 500 will be illustrated with reference to FIG. 7. At 700, a message thread listing is displayed, for example in the message thread listing view 500 of FIG. 5. At 710, selection of a single thread entry listed in the message thread listing is detected. Once a message thread has been selected in this manner, at 720 selection of a single-message action is detected. In this example, the single-message action is a reply action. A reply command, as those skilled in the art appreciate, typically comprises invocation of a message composition screen, for composing a message, but the message body field of the composition screen is automatically populated with content from a single message that is selected as the parent of the reply or forward message. The reply message action is thus considered to be a "single-message" action. The selection of the single-message action can take place while the single thread entry remains selected, and more specifically, before any single message in the message thread is selected or otherwise identified.

The selected single-message action is associated with one or more message attributes. In FIG. 7, the one or more message attributes consists of the message being a received message, rather than a sent message. At 730, message attributes for the messages in the selected message thread are retrieved, for example from the corresponding message store or stores. This step may be carried out in the sequence illustrated in FIG. 7, although it may have been carried out prior to detection of the reply action selection 720. At 740, a message having message attributes matching the one or more message attributes is identified. There may be more than one message having matching attributes, in which case the most recent message in the message thread (i.e., the message with the most recent timestamp) having those matching attributes is identified. The identification of the most recent message may be explicitly determined by comparing timestamps of messages with matching attributes in the thread or by evaluating the messages of the thread in a chronological or reverse chronological order. The selected action is then applied at 750 to the message identified at block 740.

A further example of this process with multiple message attributes is illustrated with reference to the set of representative messages set out in Table 1 below:

TABLE 1

| # | Attribute | Sender | Recipient | Timestamp | Body | In Reply To |
|---|---|---|---|---|---|---|
| 1 | Read (received) | Reffelle | Violet | 11:50 | It's painful trying to keep up with your . . . | n/a |
| 2 | Sent | Violet | Reffelle | 11:51 | I'm just responding to what you're sending . . . | 1 |
| 3 | Unread (received) | Reffelle | Violet | 11:53 | Nice try. You get bored and cleave the thread . . . | 2 |

Table 1 sets out message data (both metadata and content, i.e., body excerpt) for the messages in the thread represented by the thread entry 310a of FIG. 5. These individual messages are also listed in the individual message listing view 400 of FIG. 4. As can be seen by the various status icons in FIG. 4 and in the table above, the three messages in the thread have different attributes, such as different statuses: the first message 410b (message 1 in the above table), which is the first one received in the thread at the electronic device 100, has been marked read, i.e. has been opened for viewing on a display, although not necessarily literally read or otherwise consumed by the user. Message also has the attribute of being a received message, i.e., it was received at an account associated with a user of the electronic device 100 (in Table 1, the recipient "Violet" is a name associated with a user of the electronic device 100 or the account at which the message was received). The second message (410b, or message 2 in the above table) was sent by the user and thus has the attribute of a sent message. The third message (410c, or message 3) is a received message but marked unread (i.e., either never opened for viewing on the display, or previously opened but subsequently marked unread).

Referring to FIG. 5 and the process of FIG. 7 again, at 700 a message thread listing is displayed and, at 710 selection of a single thread entry listed in the message thread listing is detected. In a view such as the view 500 of FIG. 5, the various thread entries are selectable through a user interface. In the case of a touchscreen electronic device 100 an individual entry can be selectable by a touch detected on the surface of the display interface 110 corresponding to the area in which the individual thread entry is displayed (i.e., a graphical user interface element corresponding to that thread entry). Other input means that may be available at the electronic device such as an external or integrated keyboard, trackball, or optical joystick, etc., not shown in FIG. 5, can also be used to select a single message thread in the view 500.

Next, at 720, selection of the single-message action—again, a reply action—is detected. This selection can take place while the graphical user interface element corresponding to the message thread continues to be displayed as "selected" in the message thread listing view 500, as indicated by the highlight box 520 in FIG. 5. The command to invoke the single-message action can be input at and detected by the electronic device 100 by a variety of means. As illustrated in FIG. 5, for example, graphical user interface elements, such as buttons 512, 514, 516, 518 can be displayed overlaying the view 500 (in this example, in an overlay 510). Actuation of one of these elements 512, 514, 516, 518, for example by touch (via a touchscreen interface) or clicking or other selection actions (via other input mechanisms at the electronic device 100) results in invocation of the corresponding action. In FIG. 5, element 512 represents a compose message command; element 514 a reply command; element 516 a forward command; and 518 a flag command. Other means may be used to invoke the single-message action. For example, an input received via keyboard (such as actuation of a lower-case "r" key for "reply"), or selection of a reply command in a context menu (not shown in FIG. 5) may be used.

Again, the selected single-message action is associated with one or more message attributes, but in this example the one or more message attributes are that the message is a received message and that the message has been marked open or read. Again at 730, message attributes for the messages in the selected message thread are retrieved, and at 740 a message having message attributes matching the one or more message attributes is identified (although in this example the attributes include the message being marked read). As can be seen from Table 1, both messages 1 and 3 are messages that were sent by a user other than a user of the electronic device 100, and are considered to be "received" messages, but only the message 1 is both received and marked read or open. Thus in this case only message 1 meets the message attributes, so it is the most recent message matching those attributes. Had more than one message met the specified message attributes—for example, had message 3 also been marked read—then a determination is also made at 740 which of those messages is the most recent in the thread, since typically the user would wish to apply an action to a more recent message in the thread.

Next, at 750, the selected action is applied to the message identified at 740. The result in this reply example is the invocation of a compose reply message view such as that shown in FIG. 6 and described above. As a result, a fourth message is added to the thread, as shown in Table 2 below. The fourth message, as indicated by the "In Reply To" column, is generated in reply to message 1 rather than message 3 since message 1 was the most recent message in the thread that possessed the attributes associated with the reply action.

Table 3, the thread consists of five messages, with different attributes, including status (e.g., received, read, sent, unread) and different numbers of recipients. Messages 1, 3, and 5, for example, are received messages, as they were received at an account associated with the user of the electronic device 100. Messages 1 and 3 also have the attribute of being read messages. Further, messages 1, 2 and 3 have multiple recipients as can be seen in Table 3, while messages 4 and

TABLE 2

| # | Attribute | Sender | Recipient | Timestamp | Body | In Reply To |
|---|---|---|---|---|---|---|
| 1 | Read (received) | Reffelle | Violet | 11:50 | It's painful trying to keep up with your . . . | n/a |
| 2 | Sent | Violet | Reffelle | 11:51 | I'm just responding to what you're sending . . . | 1 |
| 3 | Unread (received) | Reffelle | Violet | 11:53 | Nice try. You get bored and cleave the thread . . . | 2 |
| 4 | Sent | Violet | Reffelle | 11:54 | Really. I haven't in a while. The last time . . . | 1 |

Consider the scenario where, after new message 4 was generated, received message 3 was marked read. If the same thread were then selected in the message thread listing view 500 and the reply action selected again, given the above association of message attributes with the reply action, at 740 message 3 would be selected as the parent message for the reply.

It can be seen from the foregoing that the message that is selected for use with the reply action is not necessarily the most recent message in the thread. In the example illustrated by Table 1, the most recent message in the thread is message 3, yet it was message 1 that was automatically selected because message 3 had not yet been marked open or read. Even in the embodiment where the message being marked open or read is not an attribute associated with the selected action, it may not be the most recent message in the thread that is selected for the reply action if the most recent message was not a received message.

This process can also be applied to other single-message actions such as "reply to all" or "reply-all", i.e., a reply action in which the reply message is addressed to multiple recipients including the sender and recipients (usually, recipients other than the user of the electronic device 100) of the parent message. Table 3 provides a second set of representative messages, including both metadata and content:

5 each have only one recipient. The most recent message, as defined by timestamp, is message 5.

When a message thread such as the thread represented by the thread entry 310c is selected (for example, in the message thread listing view 500 of FIG. 5), in addition to or as an alternative to the reply action, reply to all action may be available, either through a graphical user interface element (such as those displayed in the overlay 510) or through another command invocation means such as a context menu or keyboard command, as described above. The reply to all action generates a message composition view (similar to that of FIG. 6) for composition of a reply message to the sender and recipients of a parent message, even where there is more than one recipient. The address fields (either To:, Cc:, or both) of the reply message generated for editing in the message composition view are thus automatically populated with the sender and all recipient addresses from the parent message (optionally excluding the user of the electronic device 100) instead of being populated only with the address of the sender of the parent message. Again, the reply to all action is applied to a single message, and not a thread of multiple messages.

Figure 8:
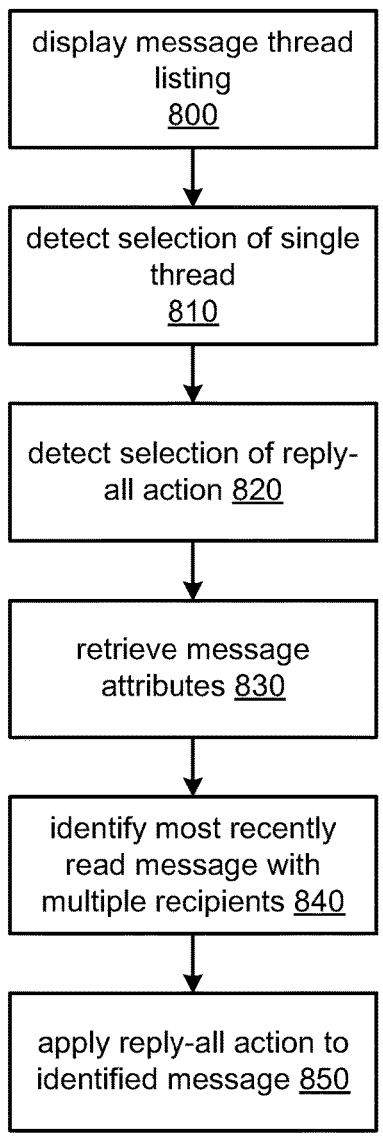
FIG. 8 is a flowchart illustrating a process for selecting a message for application of a reply-all or reply to all action.

Turning to FIG. 8, a process for automatically selecting a message in the message thread is described. Similar to the process of FIG. 7, at 800 a list of message threads is displayed. At 810, a selection of a single message thread is detected, and at 820, selection of the reply to all action is detected. Again, as with the process described above, the

TABLE 3

| # | Attribute | Sender | Recipient | Timestamp | Body | In Reply To |
|---|---|---|---|---|---|---|
| 1 | Read (received) | Rudolph | Esme, Quigley, Violet | 12:12 | Thanks for the kind words, Esme. Quigley also welcomed me . . . | n/a |
| 2 | Sent | Violet | Rudolph, Esme, Quigley | 1:04 | Well, if going away on vacation works such an improvement . . . | 1 |
| 3 | Read (received) | Rudolph | Violet, Esme, Quigley | 1:12 | Thanks, I might just do that. (That was clumsily executed but well- . . . | 2 |
| 4 | Sent | Violet | Rudolph | 1:31 | No, really, I missed you terribly. We all did . . . | 3 |
| 5 | Unread (received) | Rudolph | Violet | 1:36 | Now that was just cruel. Are you still sore about . . . | 4 |

The messages listed in Table 3 represent a set of messages in a further message thread, such as that represented by thread entry 310c in FIG. 5. In its current state as shown in single-message action (which operates on a single message rather than a set of messages) is selected before the single message (the operand of the single-message action) is identified. Also, as before, the action is associated with at least one message attribute. In this example, the attributes associated with the reply to all action are that it is a received message and that it has multiple recipients.

At 830, message attributes for the messages in the selected thread are retrieved, although this step may occur prior to the detection of the selection of the reply-all action at 820. At 840, the most recent message in the thread having the attributes associated with the reply to all action is identified. Referring to Table 3, in this case the most recent received message that has multiple recipients is message 3; while message 5 is the most recent received message in the thread, it has only one recipient. Next, at 850, the reply to all action is applied to the identified message, message 3. In this example, the action comprises invocation of a message composition screen for a reply to all recipients of message 3 (in this case, Esme and Quigley; Violet, being the user associated with the electronic device 100, may be excluded) and to the sender Rudolph. A possible result of this process, with the new reply to all message 6 in the thread, is illustrated in Table 4:

TABLE 4

| # | Attribute | Sender | Recipient | Timestamp | Body | In Reply To |
|---|---|---|---|---|---|---|
| 6 | Sent | Violet | Rudolph, Esme, Quigley | 1:37 | Yeah, right. And what was this alleged old nickname? | 3 |

As indicated above, the new message in the thread, message 6, was generated in reply to message 3; thus, the content of message 3 may be quoted in the reply message 6.

If, after adding message 6 to the thread the reply to all action is selected again while this thread is selected in the message thread list view, following the above process requiring the attributes of a received message having multiple recipients, message 3 will again be identified as the message upon which the reply to all action should operate since it is the most recent received message having multiple recipients in the thread; although message 6 has multiple recipients, it was a sent message and not a received message.

In other embodiments, the message attribute of being marked read may also be added. Alternatively, the set of attributes associated with the reply to all action may be reduced. For example, the only attribute associated with the action may be that the message must have multiple recipients, in which case message 6 could be selected at step 840 even though it is a sent message. The reply action described with reference to Tables 1 to 3, by contrast, may operate on any received message (and optionally a read message), whether the received message had only one or a plurality of recipients.

Figure 9:
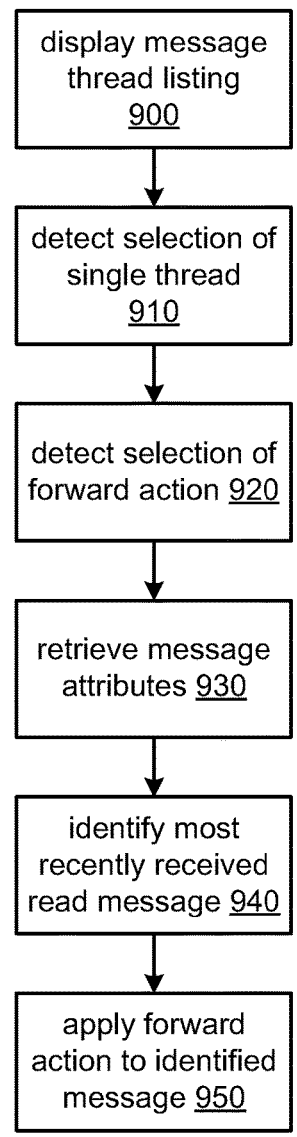
FIG. 9 is a flowchart illustrating a process for selecting a message for application of a forward action.

A further example of a single-message action is the forward action, in which a new message is generated forwarding at least a portion of the content of a selected parent message to a newly selected addressee. The message attributes that are associated with the forward action may be the same as those associated with the reply action: that the message is either a received message, or that it is both a read and received message. Returning to the message thread illustrated in Tables 3 and 4, and referring to FIG. 9, consider the circumstance where a forward action is selected to be applied to this thread (including message 6). At 900, the message thread listing view similar to the view 500 of FIG. 5 is displayed, listing as one of its entries the thread of Tables 3 and 4. At 910, selection of this thread is detected, and at 920, selection of the forward action is detected. Again, at 930, message attributes for the messages in the thread are retrieved (and this step may occur earlier in the process), and it is determined at 940 which is the most recent message in the thread that comprises the attributes associated with the forward action.

In this thread, currently the most recently received message is message 5. However, message 5 is currently marked unread in this example. Therefore, at 940, the next most recent received message is identified, which again is message 3. Message 3, since it is also marked read, is therefore identified as the parent message to which the forward action is to be applied. At 950, the forward action is applied to message 3, which can include the invocation of a message composition screen for composing a message forwarding content of message 3 to one or more recipients. Content from message 3 may be automatically inserted into the body of the message to be composed, as described above in respect of FIG. 6.

Once this new forwarding message is sent from the electronic device, a further message 7 is added to the message thread. If message 5 were to be subsequently marked read, and a new forward action applied to the thread, message 5 would be selected as the parent message for a new forwarding message since message 5 would now be the most recently received message that is marked read in the thread.

A send action, i.e., the instruction to initiate transmission of a message either from the electronic device 100 or from an account accessible by the electronic device 100, may also be applied to a draft message in a message thread. When a message is composed at the electronic device 100, it may be saved (at whatever stage of completion it may be) in the message store. Referring to FIG. 2, the message may be stored in the outbox folder 224 since it is a message that would typically be queued to be sent, but marked as a "draft" message; or it may be stored in a user-defined folder 230. The draft message, when it is stored, may contain body content, and may include a subject line (if the message format includes subject lines); zero or more addressees may have been identified for the draft message. The draft message may be subsequently edited using a message composition view in the messaging client 140.

When a composition of a new message is initiated in a reply message, a reply to all message, or a message forwarding a parent message, the new message is a child message and will typically have its subject line field (if there is one) pre-populated by the subject line of the parent message to the new child message, optionally preceded by a token indicating that the new message is a reply or forward message. Alternatively, the new message's relationship to an earlier parent message may be indicated in the new message header as discussed above. Thus, if a new message thus generated is saved in draft form rather than immediately sent, its subject line or other indicator will result in the message being included in a message thread with its parent. When a draft message exists in a message thread and a message thread listing view (such as the view 500) is displayed by the messaging client, to send the draft message (or to edit the draft message before sending) the user must select the thread, invoke an individual message listing view (similar to the view 400), and select the individual draft message to invoke the message composition view for that message in order to edit it, or else select the individual draft message to invoke a send command to send the draft message. Both the edit draft message and send message actions are also single-message actions, since like reply, reply to all, and forward they operate on a single message.

Returning to the message thread illustrated in Tables 1 and 2, the user of the electronic device 100 may begin composing a new message for the thread (such as a reply message in response to message 1), and save the new message partway through composition. An example is shown in Table 5, where a draft message, message 5, has been saved, and in the meantime a further message in the thread, message 6, has been received and read:

another means (such as a context menu or keyboard key press) does not actually initiate transmission of the draft message from the electronic device 100, even if the draft message is addressed to at least one addressee; instead, it invokes the message composition view so that the user can review the draft message before sending it. The send or edit action is associated with a message attribute, namely, that the message is a draft message.

After the selection of the send or edit action is detected, message attributes are retrieved from the thread at 1030 (although as discussed above this may take place earlier in the process), and at 1040 the most recent message that is also a draft message is identified. In the example of Table 5, the identified message would be message 5, which is not the most recent message in the thread, but is the most recent draft message in the thread. Finally, at 1050 the send or edit action is applied to the identified message. Since, in this

TABLE 5

| # | Attribute | Sender | Recipient | Timestamp | Body | In Reply To |
|---|---|---|---|---|---|---|
| 1 | Read (received) | Reffelle | Violet | 11:50 | It's painful trying to keep up with your . . . | n/a |
| 2 | Sent | Violet | Reffelle | 11:51 | I'm just responding to what you're sending . . . | 1 |
| 3 | Unread (received) | Reffelle | Violet | 11:53 | Nice try. You get bored and cleave the thread . . . | 2 |
| 4 | Sent | Violet | Reffelle | 11:54 | Really. I haven't in a while. The last time . . . | 1 |
| 5 | Draft | Violet | Reffelle | 11:55 | . . . but I can tell from the message sizes that we . . . | 1 |
| 6 | Read (received) | Reffelle | Violet | 11:56 | You just did it again. | 4 |

In this example, the unsent draft message is no longer the most recent message in the thread, since message 6 was received since the draft message was saved, as can be seen from the sequential timestamps.

Figure 10:
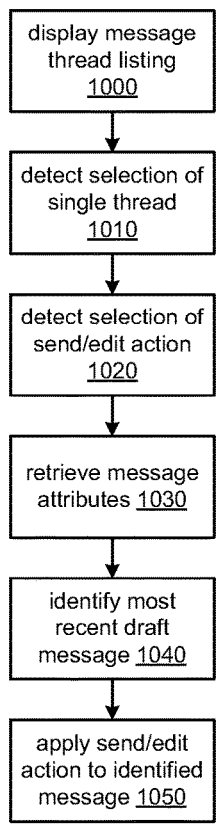
FIG. 10 is a flowchart illustrating a process for selecting a draft message for application of a send or edit action.
Figure 11:
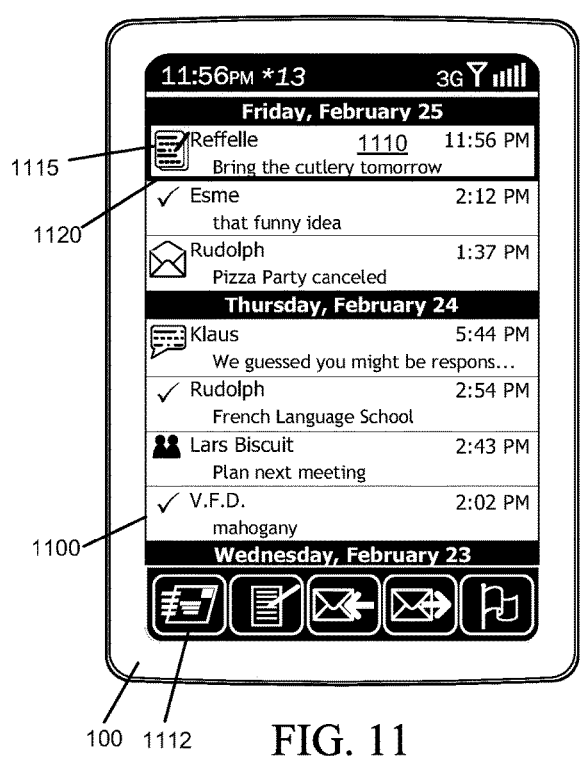
FIG. 11 is an example of a graphical user interface for displaying a message thread listing including a message thread with a draft message.

A process similar to the process described above for the reply, reply to all, and forward actions may be used for draft messages. Turning to FIG. 10, a message thread listing view is displayed at 1000, as described earlier. An example of a message thread listing view 1100 is illustrated in FIG. 11, where, similar to the message thread listing view of FIG. 5, a number of entries in a thread listing are shown. In this case, a status of the first thread entry 1110 in the listing is indicated by the display of a draft icon 1115, indicating that there is a saved draft message in the thread (such as the message 5 in Table 5 above). At 1010 in FIG. 10, selection of single thread entry is detected. The selection of first thread entry 1110 is indicated in FIG. 11 by the highlight box 1120.

Next, selection of a send or edit action is detected at 1020. A send action is an action initiating transmission of a draft message from the electronic device 100, while an edit action invokes the message composition view for a draft message. The input detected by the electronic device 100 may be the same for either the send or edit action; for example, in FIG. 11 a graphical user interface element 1112 is provided, representing the send action. Actuation of this graphical user interface element 1112 will initiate the send action for an appropriate draft message identified in the selected message thread; however, if the draft message lacks an addressee in the addressee, it cannot be sent. In that case, rather than initiate the send action, the messaging client 140 would invoke the message composition view for that draft message to give the user an opportunity to complete the message before sending. Alternatively, actuating the send graphical user interface element 1112 or invoking a send command by example, message 5 is sufficiently complete (the message body is not empty, and there is at least one addressee identified for the message, as shown in Table 5), the send action may be applied immediately to the message. Alternatively, though, the edit action is applied, and a message composition view is invoked so that further editing of message 5 may be completed.

The foregoing methods can be carried out for other types of single-message actions. For example, another single-message action that may be invoked when a thread is selected is a flag action, which sets a flag value in association with an identified message in the thread. The flag value may vary according to the settings in the messaging client 140; for example, a flag may be set to mark a message as "important", or to mark the message for follow up, and so forth. The message attributes associated with the flag may be that the message is a received message, and that the message is read, on the assumption that the user would wish to flag a message received from another party, and that the user would have read the message body before determining that it should be flagged. However, other message attributes may be associated with the flag action; for example, the action may be associated with the attribute "has attachment", i.e., that the message has an attached file.

Alternatively, if a "last changed" timestamp is stored in association with each message—a value indicating the time of the last change to the message, such as the last time its status was changed between read and unread—then the flag action could be associated with the message having the most recent "last changed" timestamp. While this may coincide with the most recently received or sent message in the thread, this will not always be the case, for example if the user subsequently marks an earlier message as unread, or files the message in a different folder on the electronic device 100.

To summarize, then, the embodiments described herein provide a method and system implementable at a device, such as the electronic device 100, for applying a single-message action to an individual message belonging to a message thread, without requiring explicit selection of the individual message by the user through a graphical user interface or other user interface. Instead, only the corresponding thread is selected, and the individual message is identified by the electronic device 100 based on message attributes that are associated with the single-message action, once the single-message action has been identified. Because the individual message is selected according to predefined criteria—the message attributes associated with the single-message action—the individual message that is selected for use with the single-message action is the likeliest most appropriate message for use with that single-message action, which may not be the case if the messaging client 140 universally applied any single-message action to the most recent message in the thread (since the most recent message could be a sent message or an unread message, when the user would have preferred to have the single-message action apply to a received or read message). Further, this solution avoids the need for the user to view messages in an individual message listing to select a message prior to selecting the single-message action to apply to it.

Figure 12:
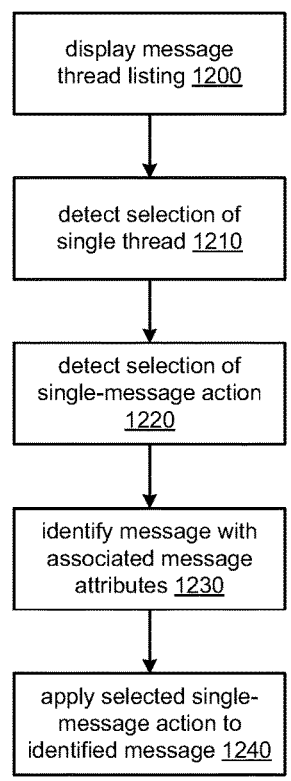
FIG. 12 is a flowchart illustrating a process for selecting a message for application of a single-message action.

FIG. 12 provides an overview of the method. At 1200, a message thread listing is displayed at the electronic device 100. At 1210, selection of a single message thread in the message thread listing is detected. At 1220, selection of a single-message action is detected. The single-message action is associated with one or more message attributes. A single message in the selected message thread is then identified at 1230, where that single message is a message that matches the message attributes associated with the single-message action. Where more than one message in the selected message thread matches the attributes, only the most recent message in the thread (i.e., the message with the most recent timestamp) is identified. At 1240, the single-message action thus selected is applied to the single message thus identified. The result of the action may be initiation of message composition, transmission of a message, or another action, applied only to a single message.

Table 6 below summarizes a number of possible single-message actions, the nature of the operation on a single message carried out by these actions, and the attributes associated with the single-message action. The attributes may be associated with the single-message actions in program code used to implement the messaging client 140, or the association between the attributes and the single-message actions may be stored elsewhere in memory at the electronic device 100. It will be appreciated, however, that the table below is not intended to be an exhaustive list of possible single-message actions or their associated attributes:

TABLE 6

| Single-Message Action | Operation | Associated Attributes |
| --- | --- | --- |
| Reply | Invoke message composition view for a reply message to the identified message, addressed to a single recipient | received; or received and read; or read or sent |
| Reply to all | Invoke message composition view for a reply message to the identified message, addressed to multiple recipients | received, multiple recipients; or received and read, multiple recipients; or read or sent, multiple recipients |

TABLE 6-continued

| Single-Message Action | Operation | Associated Attributes |
| --- | --- | --- |
| Forward | Invoke message composition view for a message forwarding the identified message | received; or received and read; or read or sent |
| Send/edit | Send identified message or invoke message composition view for editing and sending the identified message | draft; or draft, at least one designated recipient |
| Flag | Set flag for identified message | one or more of: read; received; has attachment; most recent last-changed timestamp |
| Save | Saves identified message in predefined folder | one or more of: read; received; has attachment; most recent last-changed timestamp |
| Delete | Deletes identified message | one or more of: read; most recent last-changed timestamp |
| Undelete | Undeletes identified message | deleted; or deleted and most recent last-changed timestamp |

The possible associated attributes identified in Table 6 are provided as examples only. As can be seen from the table, not every possibly relevant message attribute need be associated with a given single-message action. For example, while the example of the forward action described above with reference to FIG. 9 associated the two message attributes of "received" and "read" with the single-message action, other attribute sets—such as "received" alone—could be used. Another option is to associate either the "read" or "sent" attributes with the action; i.e., that the message was either a received message that was marked read, or a message that the user had sent from the associated account. The rationale for this set of attributes to be associated with the forward action is that the user would want to forward a message about whose contents the user was likely aware (as indicated by the fact that the message was marked read or that the user had composed and sent it). Thus, the above table sets out a number of options for message attributes to be associated with each single-message action, including those described in detail above with reference to FIGS. 7 to 10.

Other possible single-message actions include the save, delete, and undelete actions. The save action saves a message (i.e., moves or copies it) to a predetermined folder, which is specified either at the time the save action is initiated or preset using a messaging client 140 setting. Like the flag action, the save action can be associated with message attributes such as read, received, has attachment, or has most recent last-changed timestamp. The delete action has the effect of deleting the identified message from its current folder or queue. In some implementations, applying the delete action expunges the message from the message stores at the electronic device 100 (and optionally at a host message store synchronized with the device message stores) without providing the option for retrieval. In other implementations, the delete action moves the message to a deleted message folder 228 (as shown in FIG. 2), which may provide the user with the option to later restore the message to its original folder (or another folder), if the messages in the deleted message folder 228 have not been expunged in the meantime, and thus "undelete" the message. In either case, the delete action can thus act on a single message. The message attributes that can be associated with the delete action might include "read", on the presumption that the user wish to delete only a message that had been marked read, and may also include the message in the thread that has the most recent last-changed timestamp. If an undelete action is available for restoring previously deleted messages, then the message attributes associated with the action would include a "deleted" status, and optionally the message with the most recent last-changed timestamp, i.e., the most recently deleted message. In all of the above examples, when the identification of the single message matching the attributes associated with the single-message action is carried out at 1230 and there are multiple messages matching those attributes, then the most recent message in the message thread having those attributes is identified. If one of the message attributes associated with the single-message action is the most recent last-changed timestamp, however, then this determination is used in place of determining the most recent message in the message thread.

The determination that a message in a thread is a "received" or "sent" message need not be made based on an explicit status or other explicit attribute set for that message (such as a flag or other explicit value identifying the message as "received" or "sent"). This attribute may be determined based on the particular folder or queue in which the message is stored. If received email messages, for example, are stored in the inbox folder 222 illustrated in FIG. 2, then the identification of received messages in a given thread can be accomplished by identifying the messages of the thread that are stored in the inbox folder 222; similarly, sent email messages can be identified from the sent message folder 226. If draft messages are stored in the outbox folder 224, then the identification of draft messages in a given thread can be carried out by identifying the messages of the thread that are stored in the outbox folder 224. Similarly, deleted messages in a thread can be identified by their location in the deleted folder 228.

The option to select a single-message action may be made available at the electronic device 100 only when it is determined that there is a message in the thread that is a possible operand for that action. Thus, for example, if the message thread selected were thread entry 310a of FIG. 5, which consists of messages between two addressees and not a group of three or more, the reply to all action may not be available to be selected in the overlay 510, in a context menu, or by a keyboard shortcut keypress. A reply to all graphical user interface element may only appear in the overlay, or the option to reply to all may be shown in a context menu, if it is determined that at least one of the messages in the selected thread has multiple recipients (and, if the message attributes associated with the reply to all action require that the message be a read received message, that there is at least one read received message with multiple recipients in the thread). This is an embodiment that would require retrieval of message attributes for the messages in the selected thread prior to detection of the selected single-message action, as the retrieved message attributes are used to determine which single-message actions are to be made available to the user. It will be appreciated, however, that selection of the thread and determination of available message actions in this manner does not result in identification of the target message that is to be operated on by the single-message action, as a determination which is the most recently received message having the associated message attributes has not yet been made.

It can be appreciated that the embodiments described herein provide an electronic device, messaging client, and method by which a selected single-message action can be applied to a message contained in a multiple-message thread without requiring express selection of the individual message in the thread. This feature is particularly useful where the messaging client displays the contents of a message inbox (or other folder) in an aggregated view in which only groups or threads of messages are listed, rather than individual messages. These embodiments thus avoid the need to expressly display a listing of individual messages in a graphical user interface in order to be able to select an individual message to which the single-message action is to be applied.

The systems and methods disclosed herein are presented only by way of example and are not meant to limit the scope of the subject matter described herein. Other variations of the systems and methods described above will be apparent to those in the art and as such are considered to be within the scope of the subject matter described herein. For example, it should be understood that steps and the order of the steps in the processing described herein may be altered, modified and/or augmented and still achieve the desired outcome. Throughout the specification, terms such as "may" and "can" are used interchangeably and use of any particular term should not be construed as limiting the scope or requiring experimentation to implement the claimed subject matter or embodiments described herein.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. Various functional units described herein have been expressly or implicitly described as modules and agents, in order to more particularly emphasize their independent implementation and operation. It is also noted that an agent, module or processor includes but is not limited to a unit of code that performs a software operation, and can be implemented for example as a sub-routine unit of code, or as a software function unit of code, or as an object (as in an object-oriented paradigm), or as an applet, or in a computer script language, or as another type of computer code. The various functional units may be implemented in hardware circuits comprising custom VLSI circuits or gate arrays; field-programmable gate arrays;

programmable array logic; programmable logic devices; commercially available logic chips, transistors, and other such components. Modules implemented as software for execution by a processor or processors may comprise one or more physical or logical blocks of code that may be organized as one or more of objects, procedures, or functions. The modules need not be physically located together, but may comprise code stored in different locations, such as over several memory devices, capable of being logically joined for execution. Modules may also be implemented as combinations of software and hardware, such as a processor operating on a set of operational data or instructions.

A portion of the disclosure of this patent document contains material which is or may be subject to one or more of copyright, design patent, industrial design, or unregistered design protection. The rights holder has no objection to the reproduction of any such material as portrayed herein through facsimile reproduction of the patent document or patent disclosure, as it appears in the Patent and Trademark Office patent file or records, but otherwise reserves all rights whatsoever.

The invention claimed is:

1. A method implemented at an electronic device, the method comprising:
    displaying, on a display of the electronic device, a message thread listing view comprising a listing of message threads, each message thread comprising a plurality of email messages;
    while the message thread listing view is displayed, detecting a selection of one of the message threads from the listing of message threads;
    concurrently displaying a menu overlaying the message thread listing view and a highlighted box representation of the selected message thread, the menu including one or more user interface elements associated with single-message actions applicable to messages of the selected message thread, wherein the single-message actions include at least a reply-to-all action;
    detecting a selection of a first user interface element that is associated with the reply-to-all action while the selected message thread is displayed in the highlighted box representation; and
    in response to detecting the selections of the message thread and the first user interface element:
        automatically identifying a first email message from the selected message thread for applying the reply-to-all message based on:
            automatically identifying a subset of the messages from the selected message thread, the subset including only those messages that have multiple recipients; and
            selecting one of the messages in the subset that is the most recently received message among messages of the subset and that is different from a most recently received message of the selected message thread that does not have multiple recipients, and
        replacing the message thread listing view with a message composition view for composing a reply-to-all message, wherein an address field of the reply-to-all message is pre-populated using addresses from the identified first message.

2. The method of claim 1, wherein detecting the selection of one of the message threads comprises detecting selection of a graphical user interface element displayed on the electronic device, the graphical user interface element corresponding to said one of the message threads, and wherein said selection of the first user interface element is detected while said graphical user interface element is selected.

3. The method of claim 1, further comprising sending the composed reply-to-all message.

4. The method of claim 1, wherein the listing of message threads comprises an entry for each message thread, the entry for each message thread comprising a representation of at least part of a common characteristic of each of the plurality of email messages comprised in the message thread.

5. The method of claim 1, wherein the identifying of the first email message occurs while the message thread listing view is displayed.

6. The method of claim 1, wherein the reply-to-all message is composed as a reply to the identified first message.

7. The method of claim 6, wherein content of the identified first message is quoted in the reply-to-all message.

8. An electronic device, comprising:
    a display interface;
    a processor in communication with the display interface, the processor being configured to:
        display, on the display interface, a message thread listing view comprising a listing of message threads, each message thread comprising a plurality of email messages;
        while the message thread listing view is displayed, detect a selection of one of the message threads from the listing of message threads;
        concurrently display a menu overlaying the message thread listing view and a highlighted box representation of the selected message thread, the menu including one or more user interface elements associated with single-message actions applicable to messages of the selected message thread, wherein the single-message actions include at least a reply-to-all action;
        detect a selection of a first user interface element that is associated with the reply-to-all action while the selected message thread is displayed in the highlighted box representation; and
        in response to detecting the selections of the message thread and the first user interface element:
            automatically identify a first email message from the selected message thread for applying the reply-to-all message based on:
                automatically identifying a subset of the messages from the selected message thread, the subset including only those messages that have multiple recipients; and
                selecting one of the messages in the subset that is the most recently received message among messages of the subset and that is different from a most recently received message of the selected message thread that does not have multiple recipients, and
            replace the message thread listing view with a message composition view for composing a reply-to-all message, wherein an address field of the reply-to-all message is pre-populated using addresses from the identified first message.

9. The electronic device of claim 8, wherein detecting the selection of one of the message threads comprises detecting selection of a graphical user interface element displayed on the electronic device, the graphical user interface element corresponding to said one of the message threads, and wherein said selection of the first user interface element is detected while said graphical user interface element is selected.

10. The electronic device of claim 8, wherein the processor is further configured to send the composed reply-to-all message.

11. The electronic device of claim 8, wherein the listing of message threads comprises an entry for each message thread, the entry for each message thread comprising a representation of at least part of a common characteristic of each of the plurality of email messages comprised in the message thread.

12. The electronic device of claim 8, wherein the identifying of the first email message occurs while the message thread listing view is displayed.

13. The electronic device of claim 8, wherein the reply-to-all message is composed as a reply to the identified first message.

14. The electronic device of claim 13, wherein content of the identified first message is quoted in the reply-to-all message.

* * * * *